June 11, 1946.  P. B. BURHANS  2,401,814
AUTOMATIC WEAR COMPENSATING BALL AND SOCKET JOINT
Filed April 7, 1944

P. B. Burhans
INVENTOR.

BY
ATTORNEYS.

Patented June 11, 1946

2,401,814

UNITED STATES PATENT OFFICE 2,401,814

AUTOMATIC WEAR COMPENSATING BALL-AND-SOCKET JOINT

Paul B. Burhans, Fort Myers, Fla.

Application April 7, 1944, Serial No. 529,997

2 Claims. (Cl. 287—88)

This invention relates to ball and socket joint construction, the primary object of the invention being to provide a ball and socket joint which will automatically adjust itself to compensate for wear between the movable sections thereof, thereby insuring an accurately fitting joint at all times.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
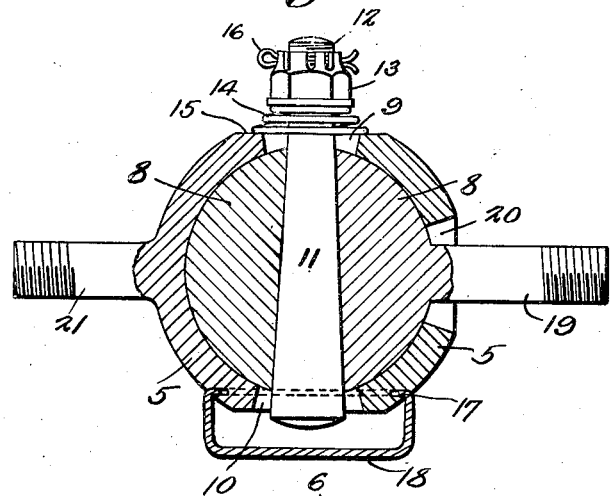
Figure 1 is a vertical sectional view through a ball and socket joint constructed in accordance with the invention.
Figure 2:
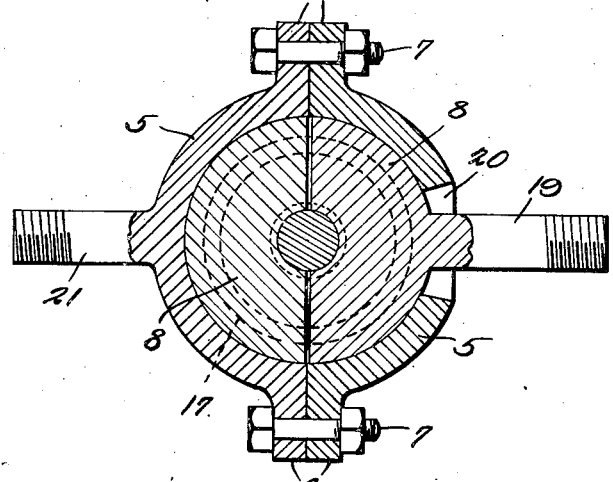
Figure 2 is a transverse sectional view through the ball and socket joint.

Referring to the drawing in detail, the socket of the ball and socket joint, embodies a pair of sections 5 which are formed with ears 6, that are provided with openings to receive the bolts 7, whereby the sections of the socket member are secured together.

The ball section of the ball and socket joint, includes a pair of semispherical sections 8 which are formed with curved inner surfaces, which when brought into registry with each other, provide a tapered bore throughout the thickness of the ball section, as clearly shown by Fig. 1 of the drawing.

The housing forming the socket section of the ball and socket joint, is formed with openings 9 and 10, which are disposed directly opposite to each other, the openings providing clearances for the ends of the tapered pin 11, which fits in the tapered bore of the ball section. One end of the pin 11 is threaded as at 12 and accommodates a nut 13 against which the spring 14 engages, the inner end of the spring 14, resting on the outer flattened surface 15 of the socket, so that the action of the spring will be to draw the pin 11 through the tapered bore of the ball section, expanding the sections of the ball and causing them to fit closely against the inner surface of the housing or socket section of the joint. A cotter key indicated by the reference character 16 extends through an opening in the threaded end of the pin 11 and engages within the castellated nut, securing the nut against rotation.

A groove is formed in the outer surface of the socket section, and accommodates the inwardly extended annular flange 17 of the grease cup 18, removably securing the grease cup in position. Thus it will be seen that due to this construction, ample lubricating material is delivered to the sections of the ball and socket joint at all times, tending to reduce wear and provide an easy working joint.

The extension 19 is formed on one of the sections of the ball, and extends through the opening 20 formed in one of the sections of the socket.

The extension 21 forms an integral part of one of the sections of the socket. These extensions 19 and 21 are formed with threads to permit rods or shafts to be readily connected to the ball and socket joint.

From the foregoing it will be seen that due to the construction shown and described, the pin will be urged in one direction, through the bore of the ball section of the joint, with the result that the sections of the ball are urged laterally, compensating for wear between the ball and socket of the joint.

What is claimed is:

1. A wear compensating ball and socket joint comprising a sectional socket member the sections of which have registering semicircular recesses in the adjacent edges thereof providing circular openings, one of the sections having a circular opening formed therein, a sectional ball mounted within the socket member, an extension on one of the sections of the ball, extending through the circular opening of the socket member, said ball sections having semicircular recesses adapted to register providing a tapered bore, a tapered expanding pin disposed within the tapered bore and adapted to urge the ball sections outwardly, the ends of the pin extending through the circular openings of the socket member, a spring mounted on one end of said pin and resting on the socket member, said spring adapted to urge the pin in one direction expanding the ball sections within the socket member, and a grease cup removably connected with the socket member and in which one end of said pin is disposed.

2. A wear compensating ball and socket joint, comprising a sectional socket member having oppositely disposed registering openings formed in the edges thereof, one of the sections having a circular opening formed therein, an extension formed on the opposite section, a sectional ball mounted within the socket member, an extension formed on one of the ball sections and adapted to extend through the circular opening, said ball sections having semicircular cut-out portions adapted to register providing a tapered bore, a tapered expanding pin disposed within the tapered bore, the ends of said pin extending through the openings of the socket member, a spring mounted on one end of the pin and resting on the socket member, normally urging the pin in one direction expanding the ball sections within the socket member, and a nut on the pin adapted to tighten said spring.

PAUL B. BURHANS.